US011059430B2

(12) United States Patent
Higashimachi et al.

(10) Patent No.: US 11,059,430 B2
(45) Date of Patent: Jul. 13, 2021

(54) SENSOR MOUNT STRUCTURE

(71) Applicant: TOYOTA JIDOSHA KABUSHIKI KAISHA, Toyota (JP)

(72) Inventors: Naoya Higashimachi, Toyota (JP); Hiroaki Ito, Toyota (JP); Koh Mizutani, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/171,999

(22) Filed: Oct. 26, 2018

(65) Prior Publication Data

US 2019/0168684 A1 Jun. 6, 2019

(30) Foreign Application Priority Data

Dec. 6, 2017 (JP) .............................. JP2017-234430

(51) Int. Cl.
| *B60R 11/04* | (2006.01) |
| *B60R 1/04* | (2006.01) |
| *H04N 5/247* | (2006.01) |
| *H04N 5/225* | (2006.01) |
| *G03B 17/56* | (2021.01) |
| *B60R 11/00* | (2006.01) |

(52) U.S. Cl.
CPC ............. *B60R 11/04* (2013.01); *B60R 1/04* (2013.01); *G03B 17/561* (2013.01); *H04N 5/2252* (2013.01); *H04N 5/2257* (2013.01); *H04N 5/247* (2013.01); *B60R 2011/005* (2013.01); *B60R 2011/0026* (2013.01)

(58) Field of Classification Search
CPC ....... B60R 2011/005; B60R 2011/0026; B60R 2011/0042; B60R 2011/04
See application file for complete search history.

(56) References Cited

U.S. PATENT DOCUMENTS 10,137,842 B2 * 11/2018 Mueller .................. B60R 11/04
2009/0295181 A1 * 12/2009 Lawlor ..................... B60R 1/12
296/1.11

(Continued)

FOREIGN PATENT DOCUMENTS

| JP | H11-078737 A | 3/1999 |
| JP | 2003-048491 A | 2/2003 |

(Continued)

*Primary Examiner* — Noam Reisner
(74) *Attorney, Agent, or Firm* — Oliff PLC

(57) ABSTRACT

A sensor mount structure, including: a first sensor device that includes a first sensor configured to detect surroundings information for a vehicle, and that is attached to an inner surface of a front windshield glass further toward a vehicle front and upper side than an interior mirror; a second sensor device that includes a second sensor configured to detect surroundings information for the vehicle, and that is attached to the inner surface of the front windshield glass further toward the vehicle front and upper side than the interior mirror and further toward the vehicle front side than the first sensor device; and a view angle hood member that is disposed at a vehicle front and lower side of the first sensor, the view angle hood member overlapping with the second sensor device in a vehicle front-rear direction in side view along a vehicle width direction.

4 Claims, 13 Drawing Sheets

(56) References Cited

U.S. PATENT DOCUMENTS

| | | | | |
|---|---|---|---|---|
| 2012/0013741 | A1* | 1/2012 | Blake, III | B60R 11/00 |
| | | | | 348/148 |
| 2014/0055617 | A1* | 2/2014 | Minikey, Jr. | B60R 1/04 |
| | | | | 348/148 |
| 2015/0015713 | A1* | 1/2015 | Wang | H04N 7/18 |
| | | | | 348/148 |
| 2015/0042874 | A1* | 2/2015 | Takeda | B60R 11/04 |
| | | | | 348/374 |
| 2015/0097013 | A1* | 4/2015 | Rawlings | B60R 1/12 |
| | | | | 224/567 |
| 2015/0251605 | A1* | 9/2015 | Uken | H04N 5/2257 |
| | | | | 248/467 |
| 2015/0314735 | A1 | 11/2015 | Krug et al. | |
| 2016/0227079 | A1* | 8/2016 | Oh | B60R 11/04 |
| 2016/0229346 | A1* | 8/2016 | Oh | B60R 1/12 |
| 2017/0001565 | A1 | 1/2017 | Nakano et al. | |
| 2017/0295610 | A1 | 10/2017 | Usami et al. | |
| 2017/0371345 | A1* | 12/2017 | Cohen | G05D 1/0246 |

FOREIGN PATENT DOCUMENTS

| | | |
|---|---|---|
| JP | 2010-103810 A | 5/2010 |
| JP | 2015-533355 A | 11/2015 |
| JP | 2016-085187 A | 5/2016 |
| JP | 2017-017480 A | 1/2017 |
| JP | 2017-185896 A | 10/2017 |

\* cited by examiner

SENSOR MOUNT STRUCTURE

CROSS-REFERENCE TO RELATED APPLICATION

This application is based on and claims priority under 35 USC 119 from Japanese Patent Application No. 2017-234430 filed on Dec. 6, 2017, the disclosure of which is incorporated by reference herein.

BACKGROUND

Technical Field

The present disclosure relates to a sensor mount structure.

Related Art

Structures have been proposed in which a vehicle-mounted camera that images a travel environment ahead of a vehicle is attached to an inner surface of a front windshield glass further toward a vehicle front and upper side than a room mirror (interior mirror) (see, for example, Japanese Patent Application Laid-Open (JP-A) No. 2003-48491).

In order to provide high-level driving assistance, including in automated driving, plural cameras with different focal distances and different view angles are required. However, in cases in which plural cameras are installed at an inner surface of a front windshield glass so as to be further toward the vehicle front and upper side than an interior mirror, there are constraints regarding the installation space in consideration of, for example, not obstructing the field of view of an occupant (the driver).

SUMMARY

Accordingly, an object of the present disclosure is to obtain a sensor mount structure that achieves a reduction in the space needed for installation when two sensor devices that detect surroundings information for a vehicle are installed at the inner surface of a front windshield glass so as to be further toward a vehicle front and upper side than an interior mirror.

In order to achieve the above object, a sensor mount structure of a first aspect of the present disclosure includes a first sensor device, a second sensor device, and a view angle hood member. The first sensor device includes a first sensor configured to detect surroundings information for a vehicle, and is attached to an inner surface of a front windshield glass further toward a vehicle front and upper side than an interior mirror. The second sensor device includes a second sensor configured to detect surroundings information for the vehicle, and is attached to the inner surface of the front windshield glass further toward the vehicle front and upper side than the interior mirror and further toward the vehicle front side than the first sensor device. The view angle hood member is disposed at a vehicle front and lower side of the first sensor. Moreover, the view angle hood member overlaps with the second sensor device in a vehicle front-rear direction in side view along a vehicle width direction.

In the first aspect of the present disclosure, the view angle hood member is disposed at the vehicle front and lower side of the first sensor and overlaps with the second sensor device in the vehicle front-rear direction in side view along the vehicle width direction. Accordingly, the vehicle front-rear direction length from the second sensor device to the first sensor device is reduced in comparison to cases in which the view angle hood member does not overlap with the second sensor device in the vehicle front-rear direction, thereby reducing the space needed for installation of the first sensor device and the second sensor device.

A sensor mount structure of a second aspect of the present disclosure is the sensor mount structure of the first aspect, wherein the interior mirror is supported by a support member formed in a shape of a casing.

In the second aspect of the present disclosure, the interior mirror is supported by the support member that is formed in a shape of a casing. Support rigidity of the interior mirror is accordingly better secured than in cases in which, for example, the interior mirror is supported by a flat plate shaped support member.

A sensor mount structure of a third aspect of the present disclosure is the sensor mount structure of the second aspect, wherein the first sensor device includes a device body holding the first sensor, and the support member is fastened together with the device body to a base member attached to the inner surface of the front windshield glass.

In the third aspect of the present disclosure, the support member that supports the interior mirror is fastened, together with the device body of the first sensor device, to the base member attached to the inner surface of the front windshield glass. The number of components (fasteners) is accordingly reduced in comparison to cases in which the support member is fastened to the base member separately to the device body of the first sensor device.

A sensor mount structure of a fourth aspect of the present disclosure is the sensor mount structure of the third aspect, wherein a portion of the device body is housed in the support member, and a space is formed between an outer face of the portion of the device body housed in the support member and an inner face of the support member.

In the fourth aspect of the present disclosure, a space is formed between the outer face of the portion of the device body of the first sensor device housed in the support member and the inner face of the support member. Accordingly, load acting on the support member when an occupant (driver) moves the interior mirror is suppressed from acting on the first sensor device in comparison to cases in which a space is not formed between the outer face of the portion of the device body and the inner face of the support member.

A sensor mount structure of a fifth aspect of the present disclosure is the sensor mount structure of either the third aspect or the fourth aspect, wherein the view angle hood member is integrally formed with the base member.

In the fifth aspect of the present disclosure, the view angle hood member is integrally formed with the base member. Accordingly, the number of components is reduced in comparison to cases in which the view angle hood member is provided as a separate body to the device body of the first sensor device.

A sensor mount structure of a sixth aspect of the present disclosure is the sensor mount structure of the fifth aspect, wherein the base member is made from metal, and a heat generating body is provided at a lower face of the view angle hood member.

In the sixth aspect of the present disclosure, the base member is made from metal, and the heat generating body is provided at the lower face of the view angle hood member. Heat from the heat generating body is accordingly efficiently transmitted from the view angle hood member to the base member, improving anti-fogging performance of the front windshield glass.

A sensor mount structure of a seventh aspect of the present disclosure is the sensor mount structure of any one of the first to sixth aspects, wherein the first sensor is configured by a pair of left and right cameras having different focal distances from each other.

In the seventh aspect of the present disclosure, the first sensor is configured by a pair of left and right cameras having different focal distances from each other. Detection performance of surroundings information for the vehicle is thus improved in comparison to cases in which the first sensor is not configured by a pair of left and right cameras having different focal distances from each other.

The first aspect of the present disclosure enables a reduction in the space needed for installation of the two sensor devices that detect surroundings information for the vehicle when two such sensor devices are installed at the inner surface of the front windshield glass so as to be further to the vehicle front and upper side than an interior mirror.

The second aspect of the present disclosure enables support rigidity of the interior mirror to be secured.

The third aspect of the present disclosure enables a reduction in the number of components (fasteners).

The fourth aspect of the present disclosure enables load acting on the support member when an occupant (driver) moves the interior mirror to be suppressed from acting on the first sensor device.

The fifth aspect of the present disclosure enables a reduction in the number of components.

The sixth aspect of the present disclosure enables antifogging performance of the front windshield glass to be improved.

The seventh aspect of the present disclosure enables detection performance of surroundings information for the vehicle to be improved.

BRIEF DESCRIPTION OF THE DRAWINGS

Exemplary embodiments of the present disclosure will be described in detail based on the following figures, wherein.

DETAILED DESCRIPTION

Figure 1:
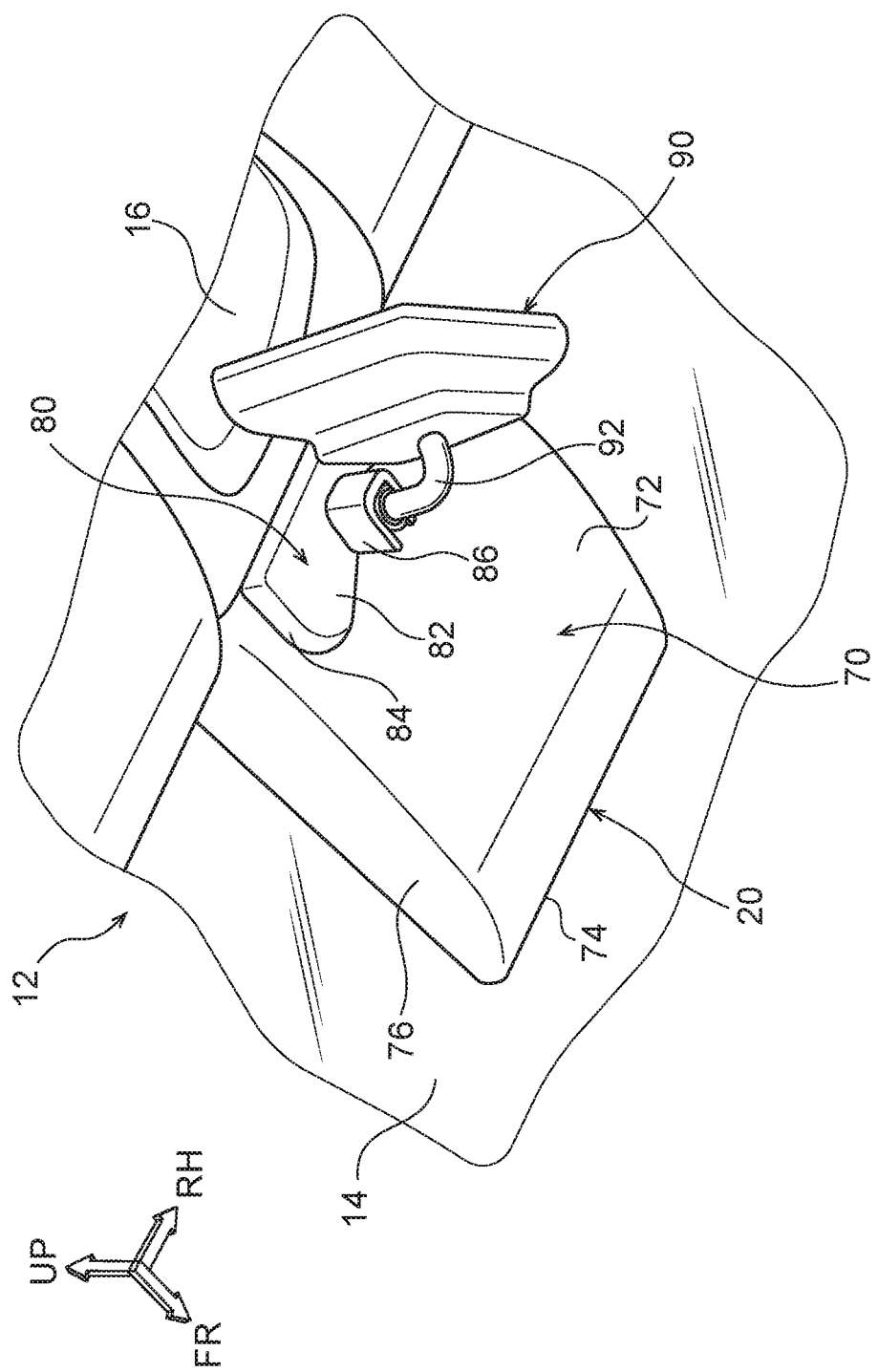
FIG. 1 is a perspective view illustrating a sensor unit provided with a sensor mount structure according to an exemplary embodiment, as viewed from a vehicle cabin side.

Detailed explanation follows regarding an exemplary embodiment according to the present disclosure, with reference to the drawings. Note that for ease of explanation, in the drawings, the arrow UP indicates a vehicle upward direction, the arrow FR indicates a vehicle front direction, and the arrow RH indicates a vehicle right direction, as appropriate. Accordingly, in the following explanation, unless specifically stated otherwise, reference to upward and downward directions, front and rear directions, and left and right directions refers to upward and downward in a vehicle vertical direction, front and rear in a vehicle front-rear direction, and left and right in a vehicle left-right direction (vehicle width direction).

Figure 2:
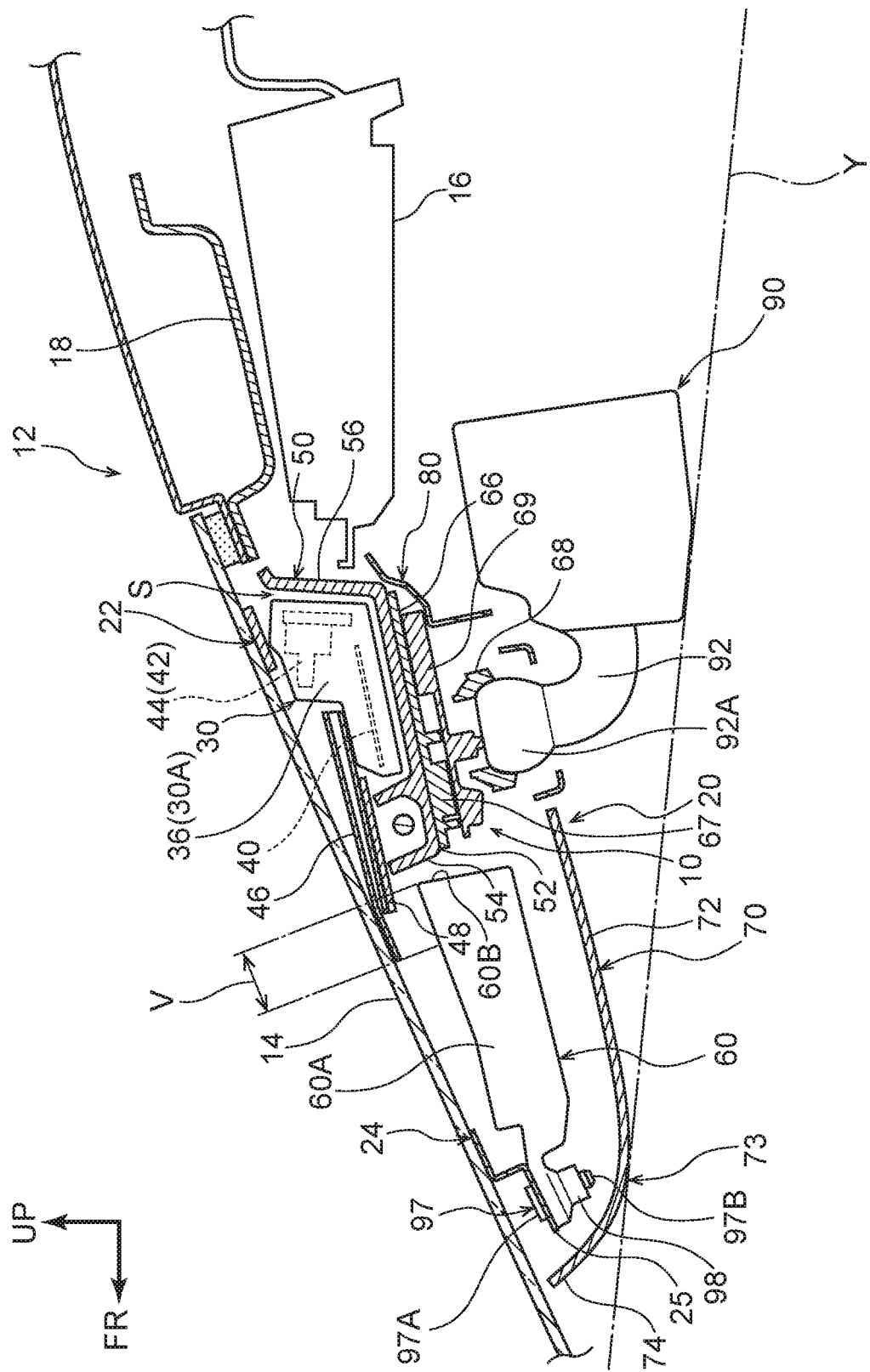
FIG. 2 is a side view cross-section illustrating a sensor mount structure according to an exemplary embodiment.

As illustrated in FIG. 1 and FIG. 2, a sensor unit 20 including a sensor mount structure 10 according to the present exemplary embodiment mounted to a vehicle 12 is provided at an inner surface of a front windshield glass 14 at a vehicle front upper side of an electronic interior mirror 90, serving as an example of an interior mirror (room mirror).

Figure 3:
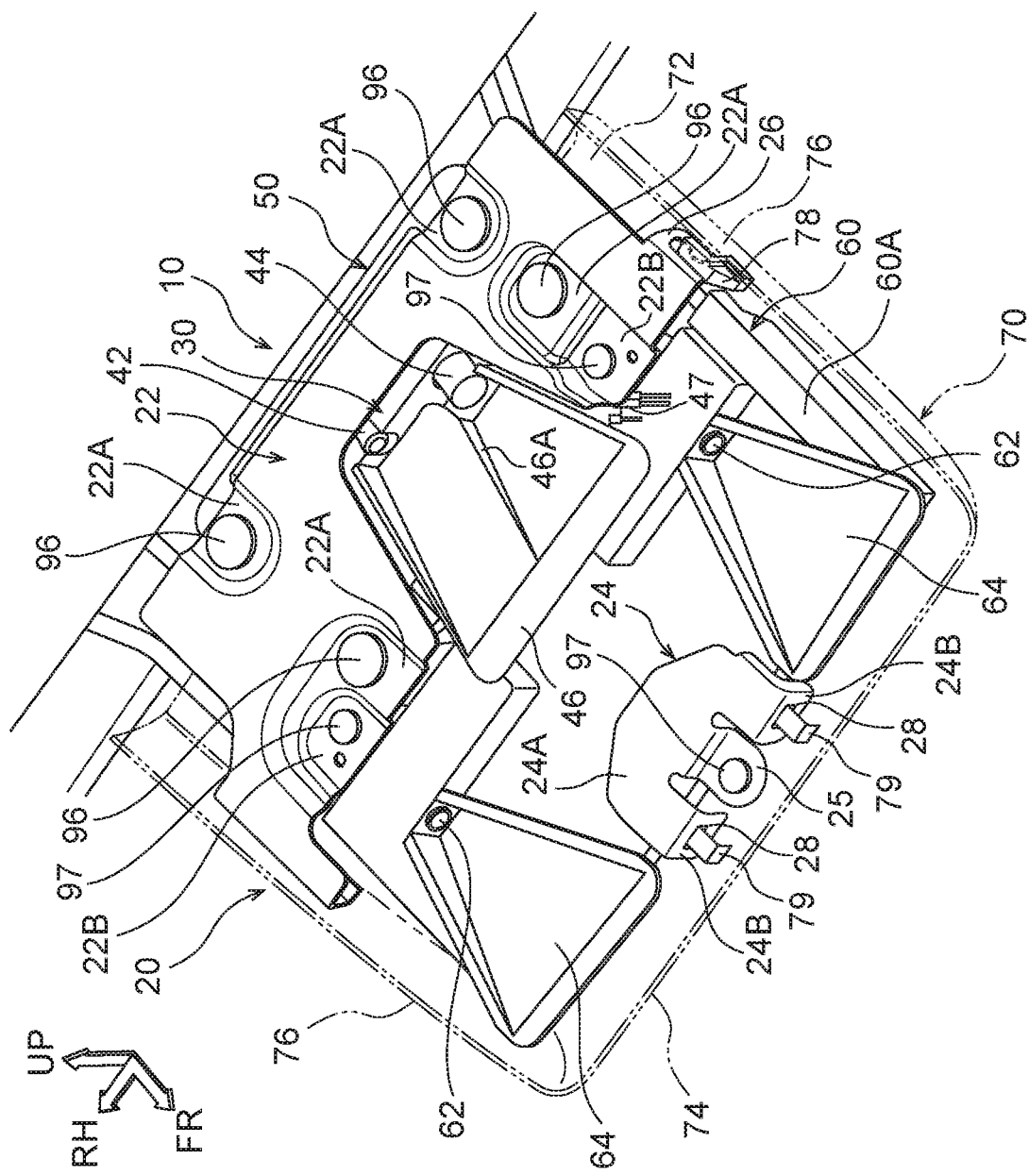
FIG. 3 is a perspective view illustrating a sensor mount structure according to an exemplary embodiment as viewed from a vehicle upper side.
Figure 4:
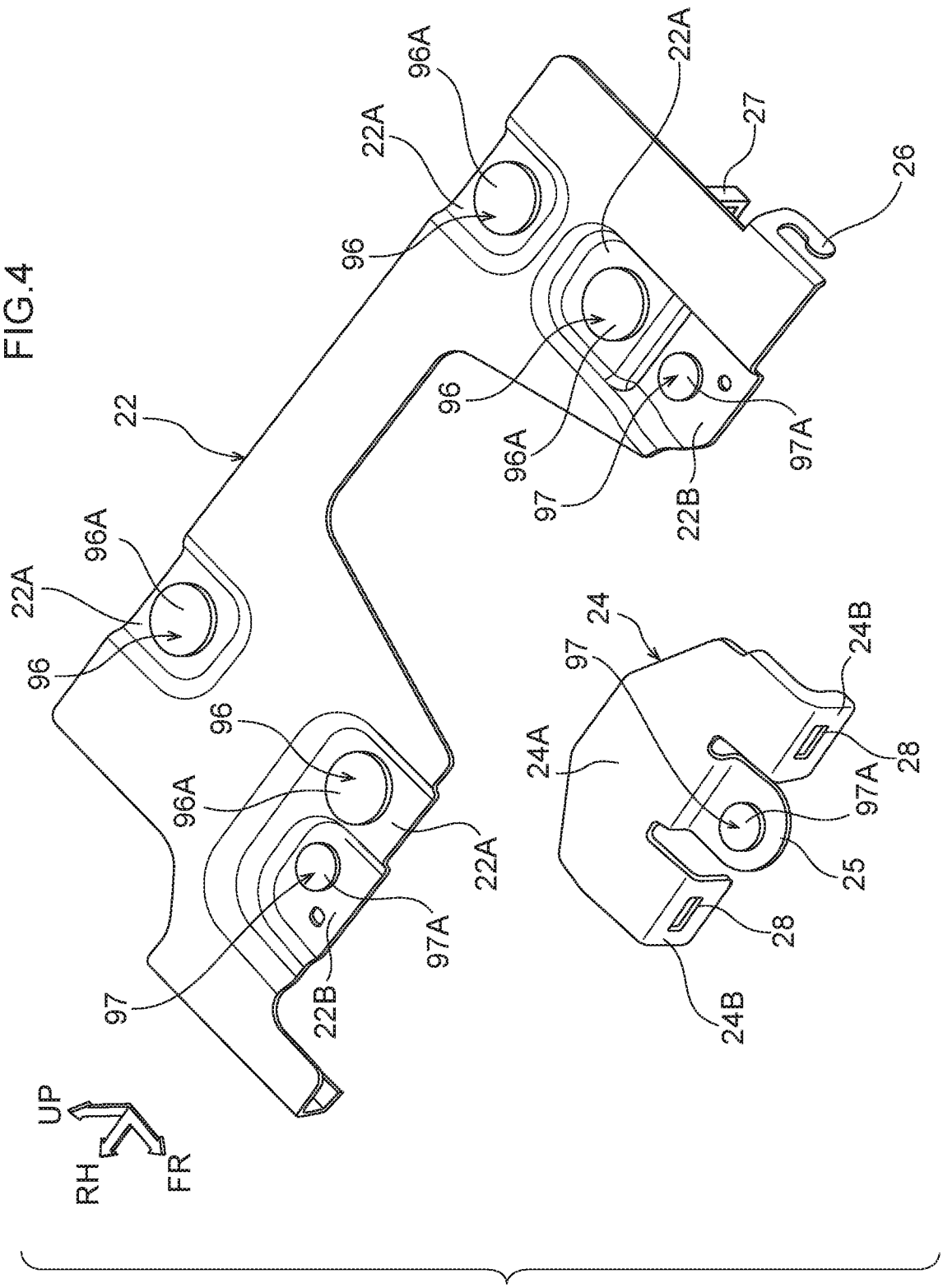
FIG. 4 is a perspective view illustrating a base member and a sub base member configuring a sensor mount structure according to an exemplary embodiment.

In more detail, as illustrated in FIG. 3 and FIG. 4, the sensor unit 20 includes a base member 22. A vehicle upper side of the base member 22 is attached to the inner surface of the front windshield glass 14 with an adhesive or the like. The base member 22 is formed from a substantially U-shaped metal sheet in plan view.

Recesses 22A are formed on both left and right sides of a rear end portion of the base member 22. A through hole that has a circular profile in plan view (not illustrated in the drawings) is formed in a bottom face of each recess 22A. A shaft 96B (see FIG. 11, FIG. 12) of a weld bolt 96, serving as a fastener, is inserted through each through hole, and a head 96A of each weld bolt 96 is fixed by welding to the bottom face of the recess 22A at the periphery of the through hole.

Recesses 22A are also formed on both left and right sides of a front portion of the base member 22. A through hole that has a circular profile in plan view (not illustrated in the drawings) is formed in a bottom face of each of these recesses 22A. A shaft 96B of a weld bolt 96 (see FIG. 11 and FIG. 12) is inserted through each through hole, and a head 96A of each weld bolt 96 is fixed by welding to the bottom face of the recess 22A at the periphery of the through hole.

These four weld bolts 96 and four nuts 98 (see FIG. 11, FIG. 12) are used to fasten a locator/telephoto camera device 30, described later, to both a housing 50 that houses part of the locator/telephoto camera device 30, and the base member 22 (joint fastening). Namely, the locator/telephoto camera device 30 and the housing 50 are fastened to the base member 22 at four locations, these being at the front, rear, left, and right.

A recess 22B is formed at a vehicle width direction outer side of the bottom face of the recess 22A formed at a front right portion of the base member 22. A through hole that has a circular profile in plan view (not illustrated in the drawings) is formed in the bottom face of this recess 22B. A shaft 97B (see FIG. 11 and FIG. 12) of a weld bolt 97, serving as a fastener with a smaller diameter than that of the weld bolt 96, is inserted through the through hole, and a head 97A of the weld bolt 97 is fixed by welding to the bottom face of the recess 22B at the periphery of the through hole.

A recess 22B is also formed at a vehicle front side of the bottom face of the recess 22A formed at a front left portion of the base member 22. A through hole that has a circular profile in plan view (not illustrated in the drawings) is formed in the bottom face of this recess 22B. A shaft 97B of a weld bolt 97 (see FIG. 11, FIG. 12) is inserted through this through hole, and the head 97A of the weld bolt 97 is fixed by welding to the bottom face of the recess 22B at the periphery of the through hole.

The two weld bolts 97 and two nuts (not illustrated in the drawings) are used to fasten both left and right sides of a rear end portion of a stereo camera device 60, described later, to the base member 22.

Further toward the vehicle front than the base member 22, a sub base member 24, this being smaller than the base member 22, is also attached to the inner surface of a substantially vehicle width direction central portion of the front windshield glass 14 using an adhesive or the like. The sub base member 24 is formed from a metal sheet that is substantially rectangular in plan view, and a vehicle width direction central portion at the front of the sub base member 24 is formed with a tongue 25 by cutting away a front end portion on either side of the vehicle width direction central portion.

The tongue 25 is bent at its base such that the tongue 25 is disposed at a lower position (further toward the vehicle lower side) than an upper face 24A of the sub base member 24. A through hole (not illustrated in the drawings) that has a circular profile in plan view is formed through the center of the tongue 25. A shaft 97B of a weld bolt 97 (see FIG. 2) is inserted through the through hole, and a head 97A of the weld bolt 97 is fixed by welding to the upper face of the tongue 25 at the periphery of the through hole.

A central side of a front end portion of the stereo camera device 60 is fastened to the sub base member 24 by the single weld bolt 97 and a single nut 98 (see FIG. 2). Namely, the stereo camera device 60 is fastened to the sub base member 24 and the base member 22 at one location at the front of the stereo camera device 60 and at two locations at the rear of the stereo camera device 60 to give a total of three locations.

A pair of left and right anchoring portions 26 that anchor a pair of left and right anchor claws 78 provided to a main cover 70, described later, are formed at both vehicle width direction end portions of the base member 22 (the right anchor claw 78 and the right anchoring portion 26 are omitted from illustration in the drawings). The anchoring portions 26 are each open on a vehicle front side, and are formed substantially in the shape of the letter J as viewed from the side. The anchor claws 78 are inserted into the anchoring portions 26 from the vehicle front so as to be anchored to the anchoring portions 26.

At both left and right sides of the tongue 25, a front end portion 24B of the sub base member 24 is bent toward the vehicle lower side, and anchoring holes 28, serving as anchoring portions that anchor together with anchor claws 79 provided to a main cover 70 are respectively formed to the front end portions 24B. Each anchoring hole 28 is formed in a substantially rectangular shape with its length direction in the vehicle width direction when viewed front-on, and the anchor claws 79 are inserted into the anchoring holes 28 from the vehicle front so as to be anchored to the anchoring holes 28.

Holder portions 27, each of which has a hat-shaped cross-section profile, are provided at both vehicle width direction end portions of the base member 22 at the vehicle rear of the anchoring portions 26. Flanges (not illustrated in the drawings) of the holder portions 27 are joined (welded) to a lower face of the base member 22. Anchor claws (not illustrated in the drawings) provided partway along wires (not illustrated in the drawings) that are connected to respective components as appropriate are fitted into the holder portions 27 from either the vehicle rear or the vehicle front such that the wires are held by the holder portions 27.

As illustrated in FIG. 2, FIG. 3, FIG. 5, and FIG. 6, the sensor unit 20 includes the locator/telephoto camera device 30 and the housing 50. The locator/telephoto camera device 30 serves as a first sensor device in which a locator camera 42 and a telephoto camera 44, described later, are attached to a device body 30A. The housing 50 serves as a support member that houses (covers) at least the periphery of a lower portion of the locator/telephoto camera device 30 (an electronic board 40, described later) from the vehicle lower side.

The device body 30A of the locator/telephoto camera device 30 is formed from a metal such as an aluminum alloy, and includes a top wall 32, a front wall 34, and side walls 36. Namely, the device body 30A lacks a rear wall and a bottom wall, and is open toward the vehicle rear and the vehicle lower side. The locator camera 42 and the telephoto camera 44 can thus be installed through the open sides.

Both left and right end portions of the top wall 32 are formed with integral flanges 33 sticking out further toward the vehicle width direction outer sides than the side walls 36 and further toward the vehicle front than the front wall 34. Each flange 33 is formed with through holes 33A that have circular profiles in plan view to allow insertion of the weld bolts 96 provided to the base member 22. The through holes 33A are separated from each other in the vehicle front-rear direction.

A protruding ledge 38 that has the same width as the front wall 34 and that sticks out toward the vehicle front is formed integrally to a lower end portion of the front wall 34. The protruding ledge 38 includes an upper wall 38A that is contiguous to the front wall 34, a side wall 38B, and a front wall 38C that is contiguous to the upper wall 38A and the side wall 38B (see FIG. 6). A front end portion of the protruding ledge 38 sticks out further toward the vehicle front than front end portions of the flanges 33.

In the device body 30A of the locator/telephoto camera device 30, the locator camera 42 and the telephoto camera 44 are retained side-by-side in the vehicle width direction. The locator camera 42 serves a first sensor used for driving assistance (automated driving) and detects surroundings information (positions, directions, distances, and the like) of the vehicle 12. The telephoto camera 44 serves as a first sensor, likewise used for driving assistance (automated driving). Note that the locator camera 42 and the telephoto camera 44 configure a pair of left and right cameras that detect different surroundings information to that detected by a stereo camera 62, described later, which allows the respective cameras to be disposed close to one another.

As illustrated in FIG. 6 to FIG. 9, the locator camera 42 and the telephoto camera 44, including respective camera bodies 43, 45, have differing lengths (focal distances) in the vehicle front-rear direction. Namely, the telephoto camera 44 (including the camera body 45) is formed longer in the vehicle front-rear direction than the locator camera 42 (including the camera body 43).

Note that the camera body 43 of the locator camera 42 and the camera body 45 of the telephoto camera 44 are each formed in substantially rectangular column shapes. The camera body 43 of the locator camera 42 and the camera body 45 of the telephoto camera 44 are attached and fixed to the front wall 34 of the device body 30A with screws or the like.

Figure 6:
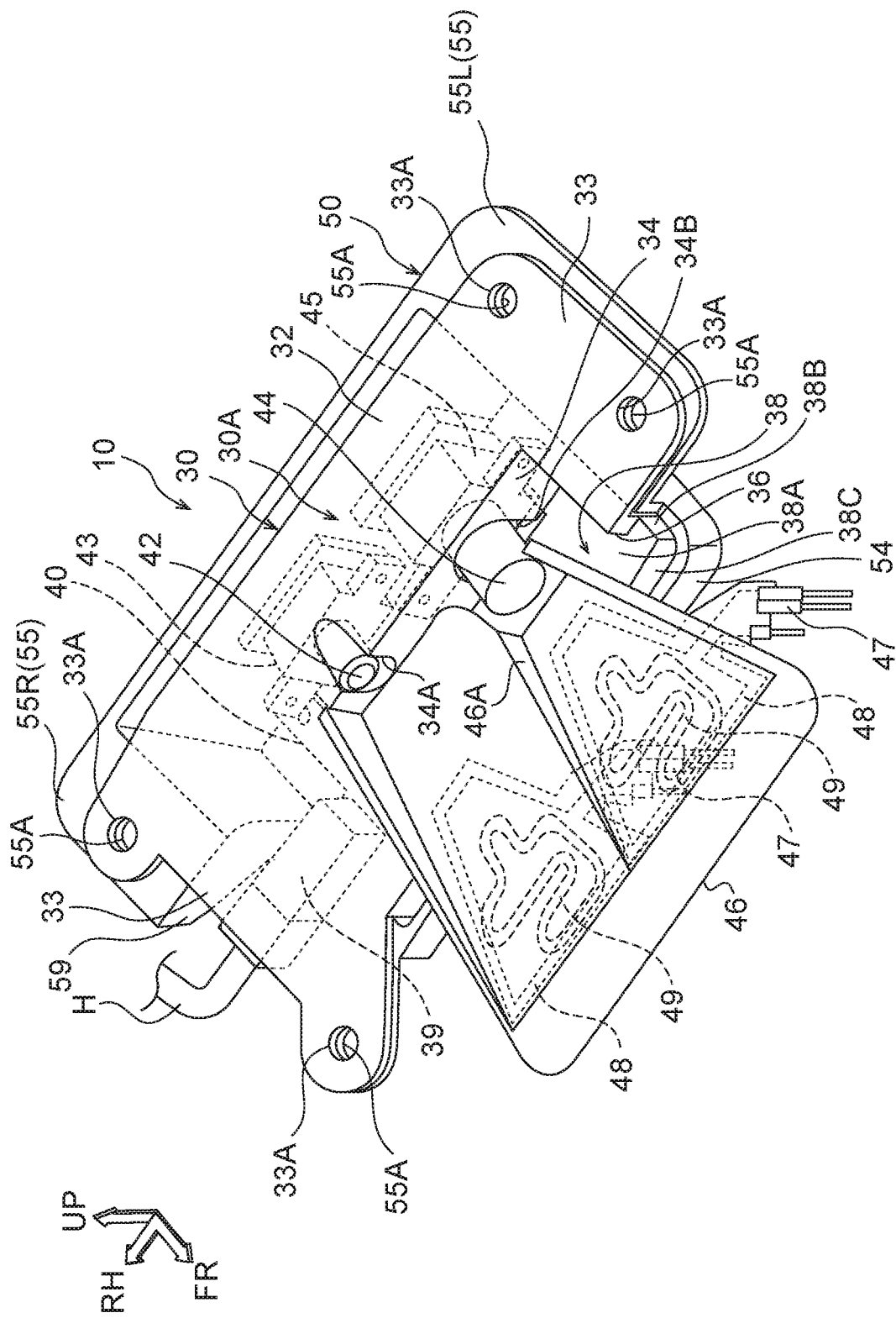
FIG. 6 is a perspective view illustrating a locator/telephoto camera device and a housing configuring a sensor mount structure according to an exemplary embodiment.
Figure 7:
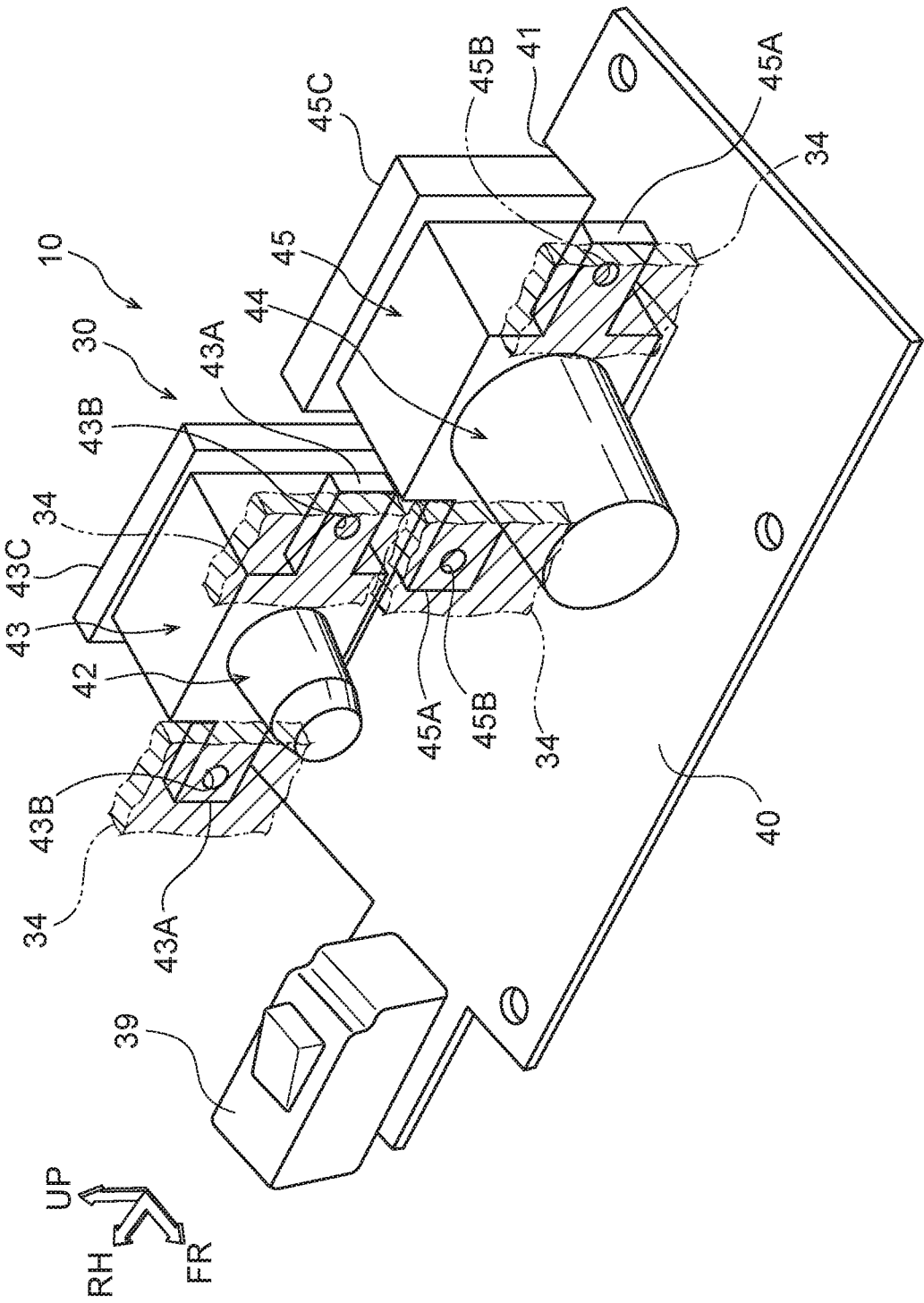
FIG. 7 is a perspective view illustrating a locator camera and a telephoto camera configuring a sensor mount structure according to an exemplary embodiment.
Figure 8:
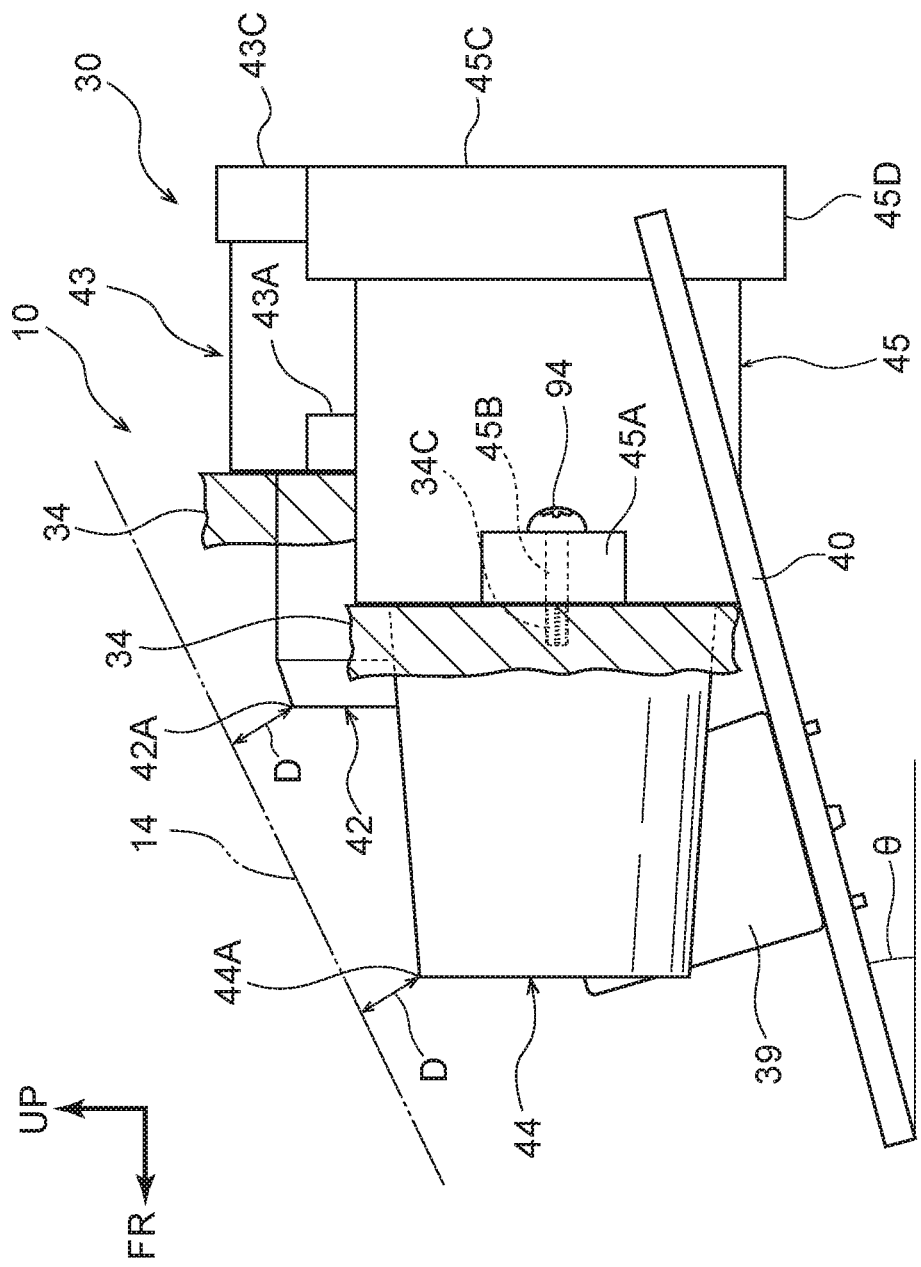
FIG. 8 is a side view illustrating a locator camera and a telephoto camera configuring a sensor mount structure according to an exemplary embodiment.
Figure 9:
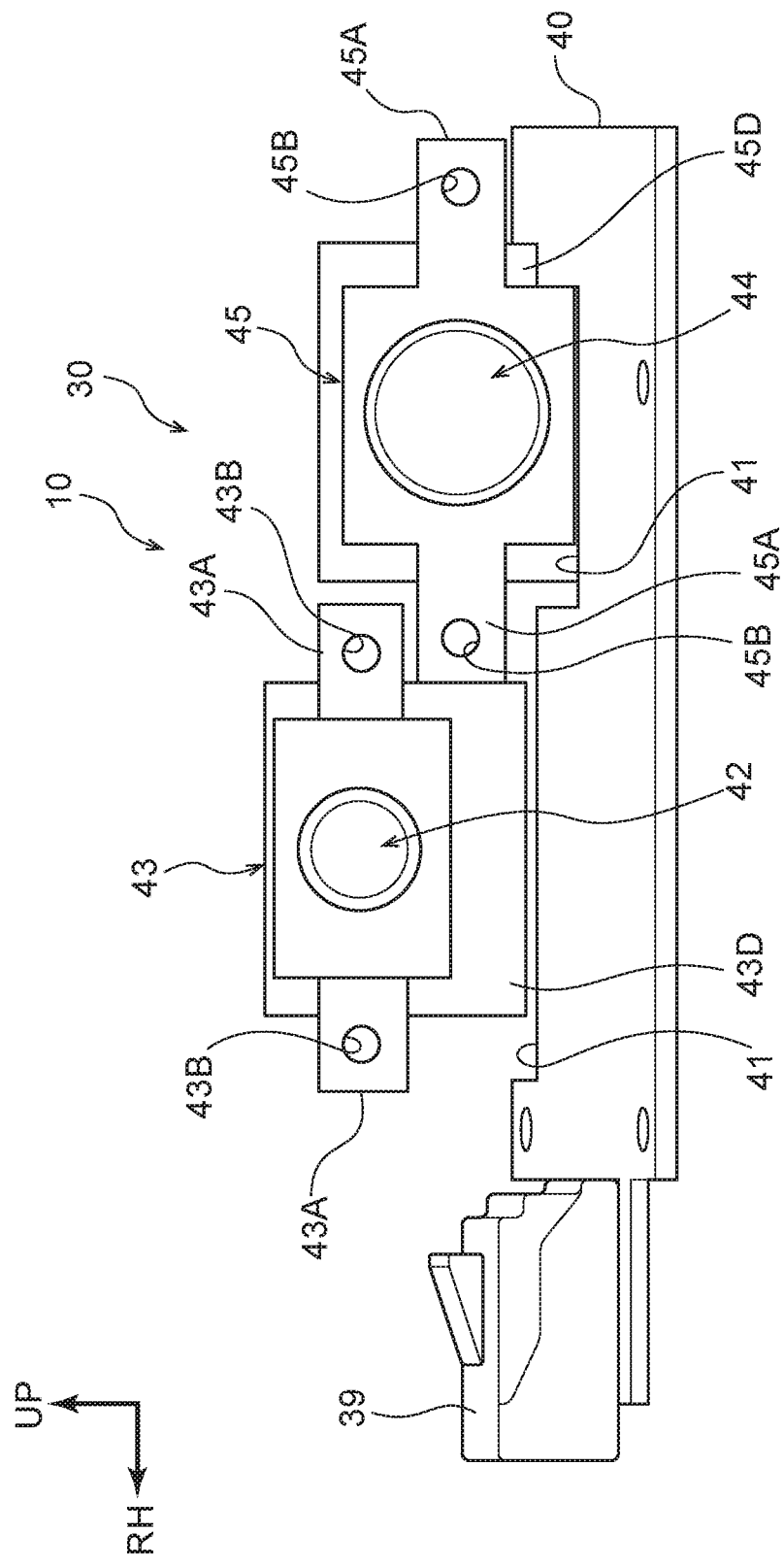
FIG. 9 is a front view illustrating a locator camera and a telephoto camera configuring a sensor mount structure according to an exemplary embodiment.

To explain in more detail, as illustrated in FIG. 6, the front wall 34 is formed with an exposing hole 34A and an exposing hole 34B, located side-by-side in the vehicle width direction. The exposing hole 34A exposes the locator camera 42 toward the vehicle front, and the exposing hole 34B exposes the telephoto camera 44 toward the vehicle front. As illustrated in FIG. 7 to FIG. 9, an inner face (reverse face) of the front wall 34 is formed with screw holes 34C (see FIG. 8), serving as female threaded portions, into which screws 94, described later, are screwed on both vehicle width direction sides of the exposing holes 34A, 34B.

Substantially rectangular flat plate shaped brackets 43A that project toward the vehicle width direction outer sides are integrally formed to vehicle vertical direction central portions of front end portions of side walls of the camera body 43 of the locator camera 42. Moreover, substantially rectangular flat plate shaped brackets 45A that project toward the vehicle width direction outer sides are formed to vehicle vertical direction central portions of front end portions of side walls of the camera body 45 of the telephoto camera 44. Through holes 43B, 45B through which the screws 94 are inserted are respectively formed at central portions of the brackets 43A, 45A.

Accordingly, front faces of the brackets 43A, 45A of the locator camera 42 (camera body 43) and the telephoto camera 44 (camera body 45) abut the inner face of the front wall 34 from the vehicle rear, and the screws 94 are inserted through the through holes 43B and the through holes 45B from the vehicle rear and screwed into the respective screw holes 34C in the front wall 34, thereby attaching the locator camera 42 (camera body 43) and the telephoto camera 44 (camera body 45) to the front wall 34.

Namely, the brackets 43A of the locator camera 42 (camera body 43) and the brackets 45A of the telephoto camera 44 (camera body 45) are attached to the front wall 34 independently of one another. More specifically, the locator camera 42 and the telephoto camera 44 should be attached close to one another in order to reduce the size of the locator/telephoto camera device 30. Namely, it is necessary to offset (vary the height positions of) the brackets 43A, 45A in the vertical direction on the mutually opposing sides (vehicle width direction central sides) of the locator camera 42 and the telephoto camera 44 in the vehicle width direction.

Accordingly, the telephoto camera 44 is disposed at a lower position (further toward the vehicle lower side) than the locator camera 42. Accordingly, front faces of the brackets 43A, 45A abut the inner face of the front wall 34 offset in the vertical direction (height direction), and the brackets 43A, 45A are fastened using different screws 94 (are not jointly fastened by common screws). Note that since the locator camera 42 is disposed at a higher position (further toward the vehicle upper side) than the telephoto camera 44, as illustrated in FIG. 6, the exposing hole 34A may be formed by also cutting away part of the front side of the top wall 32.

The locator camera 42 and the telephoto camera 44 are operated through electrical connections to the common (single) electronic board 40. The electronic board 40 is formed in a substantially rectangular flat plate shape, and its peripheral edge is attached using screws or the like to the side walls 36 and the protruding ledge 38 of the device body 30A. The electronic board 40 may therefore be understood as being a bottom wall of the locator/telephoto camera device 30. Note that a vehicle front-rear direction substantially central portion of a right end portion (one vehicle width direction end portion) of the electronic board 40 is provided with a connector 39 to connect the electronic board 40 to wiring H (see FIG. 6).

Moreover, as illustrated in FIG. 8, the electronic board 40 is disposed in a forward-tilting orientation tilted toward the vehicle front and lower side (at an angle θ with respect to the horizontal direction) at a vehicle lower side of the locator camera 42 and the telephoto camera 44. A rear face 43C of the camera body 43 of the locator camera 42 and a rear face 45C of the camera body 45 of the telephoto camera 44 are disposed at the same position as each other in the vehicle front-rear direction.

Note that the telephoto camera 44 is longer in the vehicle front-rear direction than the locator camera 42. Accordingly, even though the telephoto camera 44 is disposed at a lower position than the locator camera 42, as viewed along the vehicle width direction from the side, a front end portion upper portion 42A of the locator camera 42 and a front end upper portion 44A of the telephoto camera 44 are disposed close to the inner surface of the front windshield glass 14 (running along the inner surface of the front windshield glass 14 with substantially the same gap D, this being approximately 3 mm, for example).

Note that the vehicle front-rear direction length of the camera body 45 is also longer than the vehicle front-rear direction length of the camera body 43. Accordingly, the vehicle front-rear direction position of the brackets 43A and the vehicle front-rear direction position of the brackets 45A differ from each other (the brackets 43A are disposed further toward the vehicle rear than the brackets 45A). Accordingly, the inner face of the front wall 34 is formed with a step (see FIG. 8) such that the plate thickness of a portion of the front wall 34 fastened to the bracket 43A is thicker than the plate thickness of a portion of the front wall 34 fastened to the bracket 45A.

Moreover, as illustrated in FIG. 7 to FIG. 9, notches 41 are formed in a rear end portion of the electronic board 40 so as to accommodate a rear end lower portion 43D of the camera body 43 of the locator camera 42 and a rear end lower portion 45D of the camera body 45 of the telephoto camera 44. The notches 41 are formed continuously along the vehicle width direction corresponding to the shape of the rear end lower portion 43D of the camera body 43 of the locator camera 42 and the shape of the rear end lower portion 45D of the camera body 45 of the telephoto camera 44.

As illustrated in FIG. 2, FIG. 3, FIG. 5, and FIG. 6, a rear end portion of a view angle hood member (referred to hereafter as "hood member") 46 formed from a resin material such as polypropylene (PP) is attached to the upper wall 38A of the protruding ledge 38 of the device body 30A. The hood member 46 is formed in an isosceles trapezoidal shape that becomes wider in the vehicle width direction on progression toward the vehicle front in plan view. At least half of the hood member 46 sticks out to the vehicle front of the front end portion of the protruding ledge 38.

Both left and right sides of a rear end portion of the hood member 46 are formed with integral anchor claws (not illustrated in the drawings), and both left and right sides of a rear end portion of the upper wall 38A of the protruding ledge 38 are formed with anchoring holes (not illustrated in the drawings). Namely, the hood member 46 is attached to the upper wall 38A of the protruding ledge 38 by anchor-fitting the anchor claws into the anchoring holes.

Moreover, since the telephoto camera 44 is disposed at a lower position than the locator camera 42, the height of the hood member 46 changes at a vehicle width direction substantially central portion, such that the hood member 46 is higher on the locator camera 42 side and lower on the telephoto camera 44 side. Namely, a step 46A is formed at a vehicle width direction substantially central portion of the hood member 46.

Note that an upper face of a front end portion of the hood member 46 is configured so as not to contact (be non-contact with) the inner surface of the front windshield glass 14. The hood member 46 is colored black, for example, in order to prevent or suppress reflection of light that has passed through the front windshield glass 14 (capture of glare by the locator camera 42 and the telephoto camera 44).

Moreover, as illustrated in FIG. 2 and FIG. 6, a lower face of the hood member 46 is provided with heaters 48, serving as a heat generating bodies, and an insulating sheet (not illustrated in the drawings) serving as an insulating member interposed between the lower face and the heaters 48. Specifically, a right half of the lower face of the hood member 46, at the vehicle front of the locator camera 42, and a left half of the lower face of the hood member 46, at the vehicle front of the telephoto camera 44, are provided with respective isosceles trapezoidal shaped heaters 48 that become broader in the vehicle width direction on progression toward the vehicle front in plan view.

Figure 10:
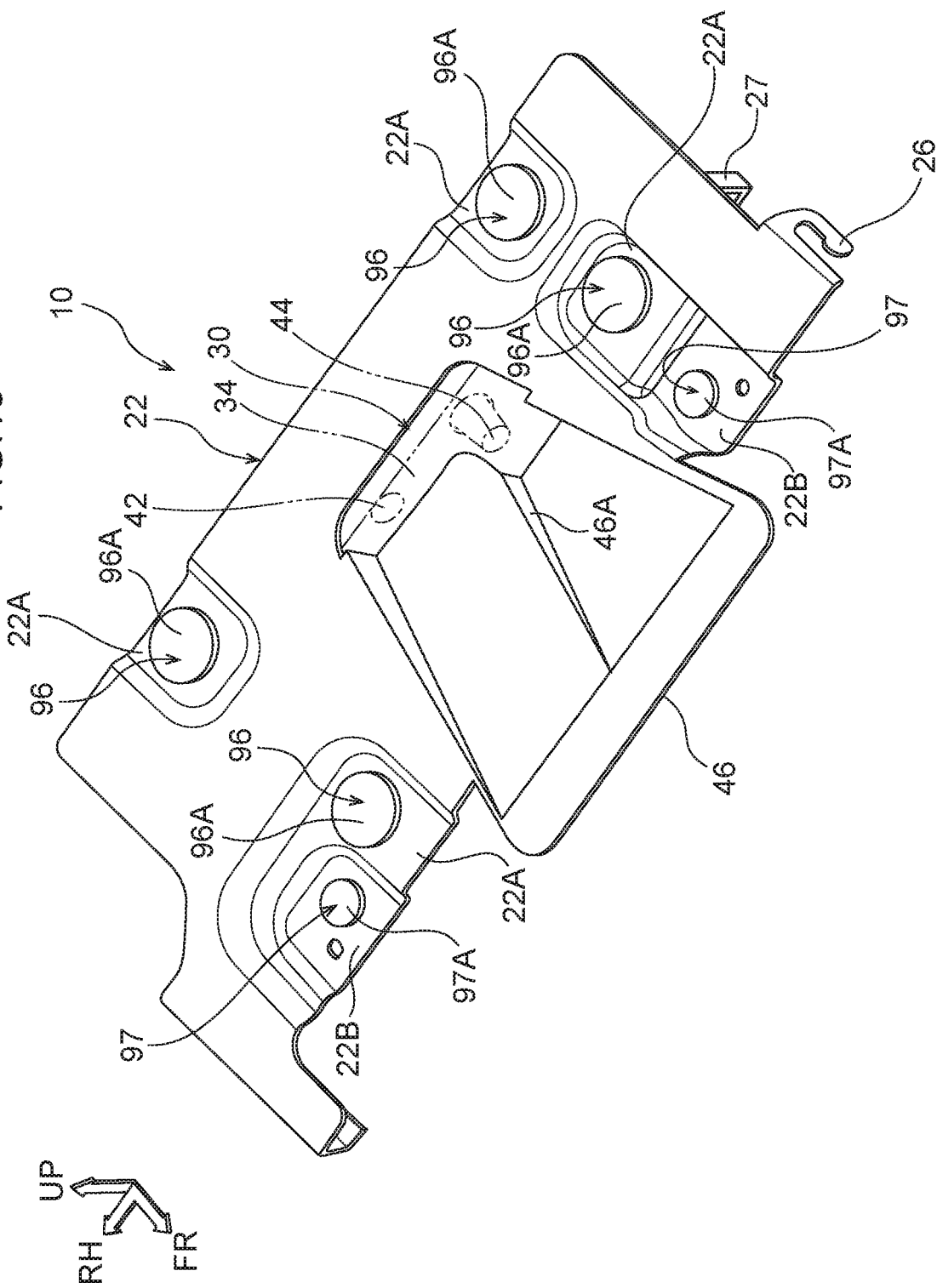
FIG. 10 is a perspective view illustrating a modified example of a base member configuring a sensor mount structure according to an exemplary embodiment.

A heater wire 49 is provided inside each heater 48. A left end portion (vehicle width direction other end portion) of each heater 48 is provided with a connector 47 used to connect the heater wire 49 to wiring (not illustrated in the drawings). Note that the hood member 46 is not limited to a configuration provided separately to the protruding ledge 38 of the device body 30A of the locator/telephoto camera device 30, and as illustrated in FIG. 10, for example, the hood member 46 may be integrally formed with the base member 22.

Namely, the hood member 46 may be formed from a metal such as an aluminum alloy, integrally with the base member 22. In such cases, the heaters 48 may be provided (affixed) to the lower face of the hood member 46 without interposing an insulating sheet therebetween. Moreover, there is no need to form anchoring holes in the upper wall 38A of the protruding ledge 38 of the device body 30A of the locator/telephoto camera device 30.

As illustrated in FIG. 2, FIG. 6, FIG. 11, and FIG. 12, the housing 50 is formed from a metal such as an aluminum alloy, and includes a bottom wall 52, and a front wall 54, rear wall 56, and left and right side walls 58 that rise up integrally from the periphery of the bottom wall 52. Namely, the housing 50 is formed in a shape of a casing open toward the vehicle upper side.

Flanges 55 are integrally formed so as to stick out from upper end portions of the left and right side walls 58 toward the vehicle width direction outer sides in substantially rectangular shapes in plan view, so as to be able to overlap the flanges 33 of the locator/telephoto camera device 30 (device body 30A). Note that in the following explanation, when distinguishing between the left and right of the left and right side walls 58 and the left and right flanges 55, the numerals are suffixed with either L or R.

Through holes 55A that are circular in plan view are formed separated from each other in the vehicle front-rear direction in each of the flanges 55. The through holes 55A allow the weld bolts 96 provided to the base member 22 to pass through. Namely, when superimposing the flanges 55 of the housing 50 on the flanges 33 of the locator/telephoto camera device 30 (device body 30A) to be jointly fastened to the base member 22, the through holes 33A of the flanges 33 and the through holes 55A of the flanges 55 are placed in communication with each other (see FIG. 6).

The housing 50 houses at least the periphery of a lower portion (the electronic board 40) of the locator/telephoto camera device 30, in a state in which the flanges 55 of the housing 50 are superimposed on the flanges 33 of the locator/telephoto camera device 30 (device body 30A) (see FIG. 6). Note that a space (gap) S is formed between outer faces of the locator/telephoto camera device 30 (device body 30A and electronic board 40) housed in the housing 50 and inner faces of the housing 50 (see FIG. 2).

More specifically, spaces S are respectively formed between a lower face of the electronic board 40 and a bottom face within the housing 50, between the rear face 43C of the locator camera 42 (camera body 43) and the rear face 45C of the telephoto camera 44 (camera body 45) and a rear face within the housing 50, between outer faces of the side walls 36 of the locator/telephoto camera device 30 (device body 30A) and a side face within the housing 50, and between a front face of the front wall 38C of the protruding ledge 38 and a front face within the housing 50.

In other words, the bottom face within the housing 50 (inner face of the bottom wall 52) is disposed at a separation from the lower face of the electronic board 40, the rear face within the housing 50 (inner face of the rear wall 56) is disposed at a separation from the rear face of the locator camera 42 (camera body 43) and the rear face of the telephoto camera 44 (camera body 45), the side faces within the housing 50 (inner faces of the side walls 58) are disposed at a separation from the outer faces (side faces) of the side walls 36 of the locator/telephoto camera device 30 (device body 30A), and the front face within the housing 50 (inner face of the front wall 54) is disposed at a separation from the front face of the front wall 38C of the protruding ledge 38.

Figure 12:
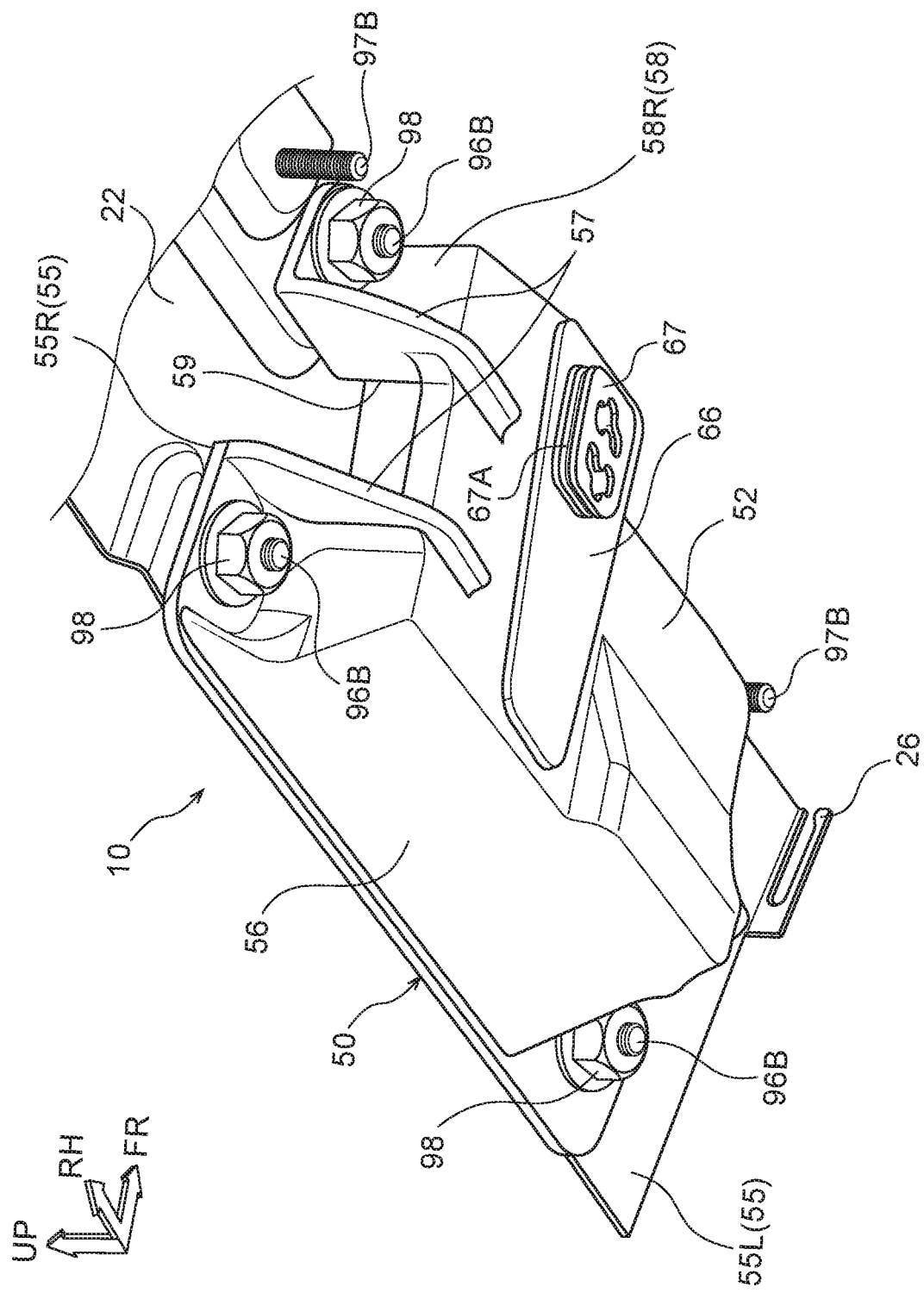
FIG. 12 is a perspective view illustrating a housing configuring a sensor mount structure according to an exemplary embodiment as viewed from the lower right.

Moreover, as illustrated in FIG. 6 and FIG. 12, a notch 59, serving as an opening to allow the connector 39 provided to the electronic board 40 of the locator/telephoto camera device 30 housed in the housing 50 to project to the vehicle width direction outer side, is formed in the right side wall 58R and the right flange 55R, between the through holes 55A that are separated from each other in the vehicle front-rear direction.

Note that the opening formed in the housing 50 is not limited to the notch 59, and, for example, the opening may be configured by a hole (not illustrated in the drawings) formed solely in the right side wall 58R or a hole (not illustrated in the drawings) straddling both the right side wall 58R and a base-side portion of the right flange 55R, as long as the connector 39 is able to project out.

Figure 11:
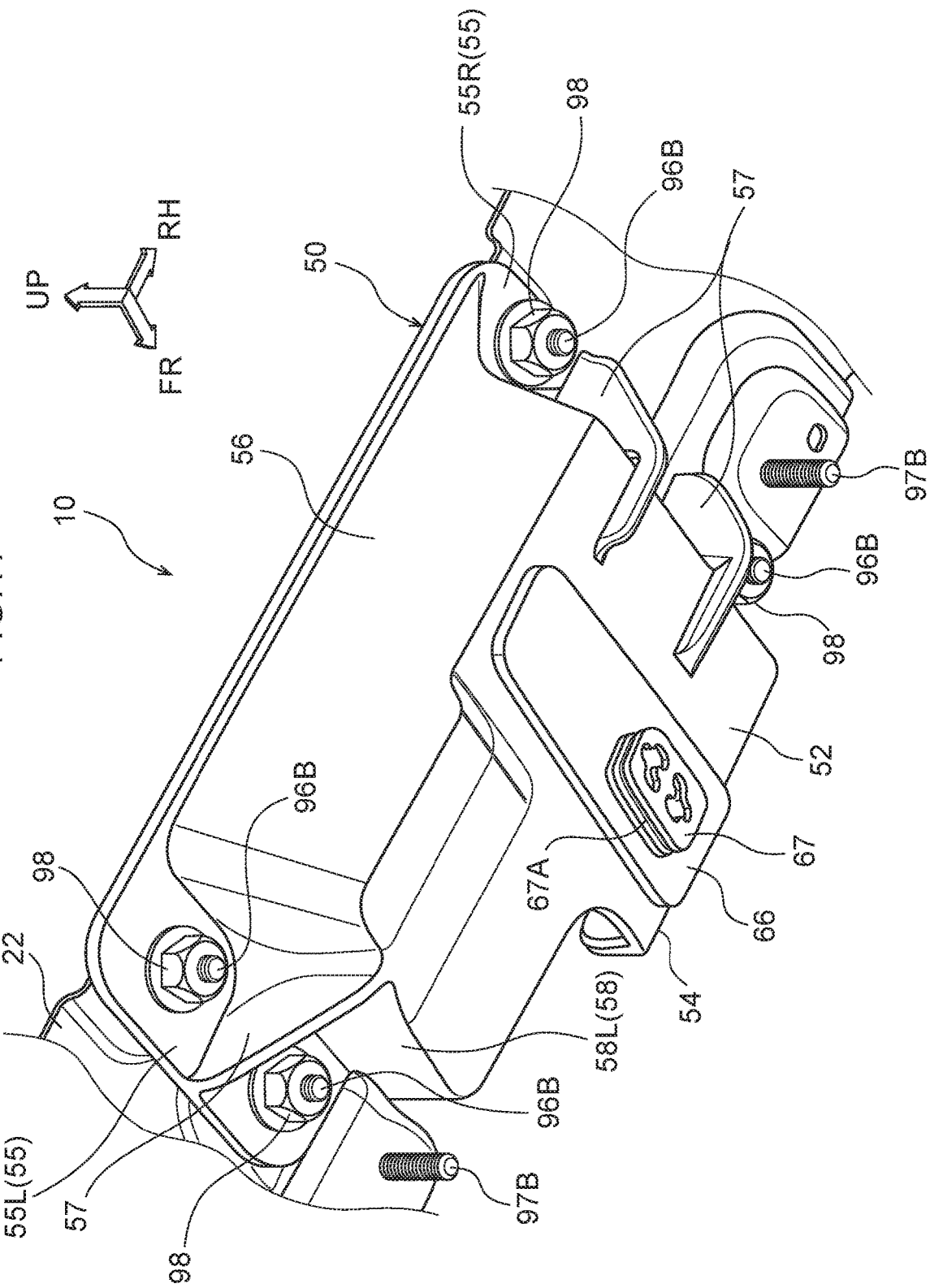
FIG. 11 is a perspective view illustrating a housing configuring a sensor mount structure according to an exemplary embodiment as viewed from the lower left.

Moreover, a pair of front and rear ribs 57 are integrally formed to reinforce the right flange 55R that is interrupted in the front-rear direction by the notch 59. The ribs 57 are formed extending from a lower face of the interrupted right flange 55R at the sides of the notch 59 (peripheral edges of the notch 59) to an outer face of the right side wall 58R and an outer face of the bottom wall 52. As illustrated in FIG. 11, a rib 57 is also integrally formed extending from a lower face on a vehicle front-rear direction substantially central side of the left flange 55L to an outer face of the left side wall 58L so as to reinforce the left flange 55L.

Figure 13:
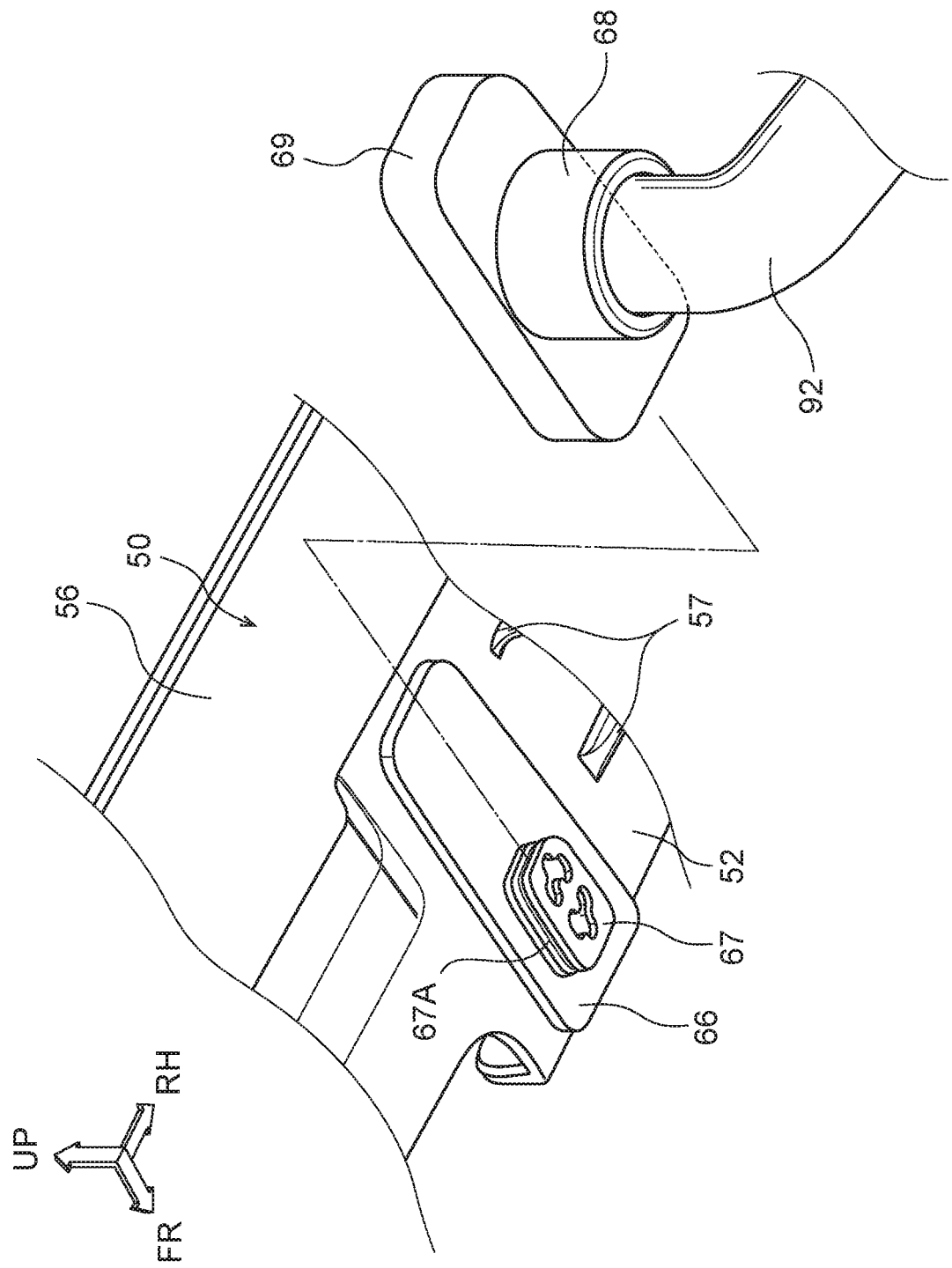
FIG. 13 is a perspective view illustrating a process to attach an electronic interior mirror to a housing configuring a sensor mount structure according to an exemplary embodiment.

Moreover, as illustrated in FIG. 11 to FIG. 13, a mirror bracket 66 is provided to a vehicle width direction substantially central portion of a lower face of the bottom wall 52 in order to attach the electronic interior mirror 90. The mirror bracket 66 is long in the vehicle front-rear direction, and short in the vehicle width direction so as to give a substantially rectangular flat plate shape in bottom face view. A fitted-to portion 67 that has a substantially rectangular shape in bottom face view projects out integrally from a lower face of a front end portion of the mirror bracket 66 for attachment of a ball joint 68.

A groove 67A is formed running along the vehicle front-rear direction at least at a side face of the fitted-to portion 67 that faces toward the vehicle width direction outer side. A fitting portion 69 extending along the vehicle front-rear direction and formed in an upper end portion of the ball joint 68 slides in from the vehicle rear so as to fit together with the groove 67A.

The ball joint 68 (electronic interior mirror 90) is thus attached to the mirror bracket 66. Note that as illustrated in FIG. 2, a spherical upper end portion 92A of an arm member 92 of the electronic interior mirror 90 is fitted into the ball joint 68, such that the electronic interior mirror 90 is supported by the housing 50 through the ball joint 68.

Figure 5:
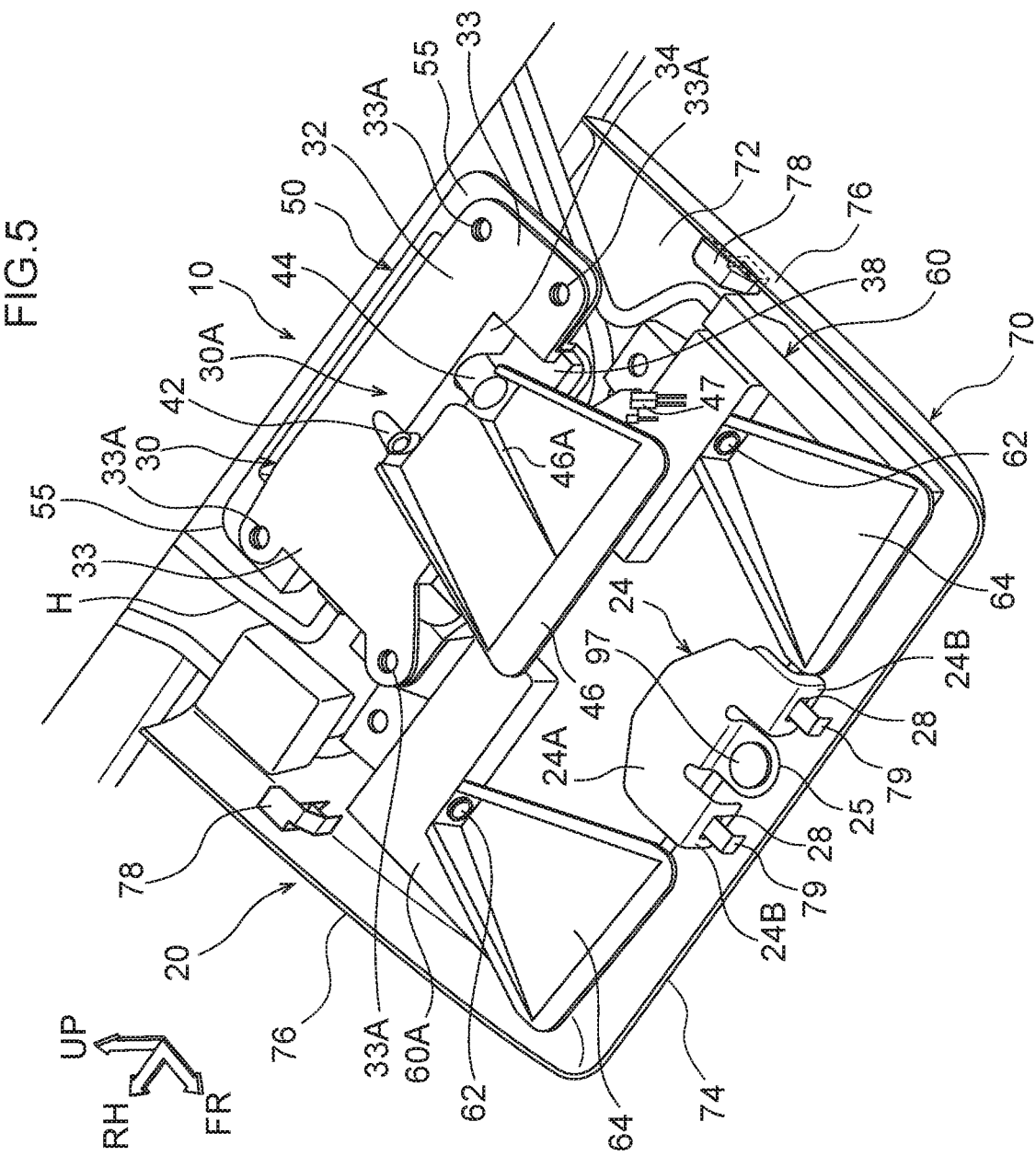
FIG. 5 is a perspective view illustrating a sensor mount structure according to an exemplary embodiment as viewed from an upper side when a base member has been removed.

As illustrated in FIG. 2, FIG. 3, and FIG. 5, the sensor unit 20 includes the stereo camera device 60, serving as a second sensor device. The stereo camera device 60 includes the pair of left and right stereo cameras 62, serving as a pair of left and right second sensors that detect surroundings information (positions, directions, distances, and the like) of the vehicle 12. The stereo camera device 60 is disposed further toward the vehicle front than the housing 50 (locator camera 42 and telephoto camera 44).

Namely, as described above, a front end portion of the stereo camera device 60 is fastened to and supported by the sub base member 24 using the weld bolts 97 and the nuts 98, and both left and right sides of a rear end portion of the stereo camera device 60 are fastened to and supported by the base member 22 using the weld bolts 97 and the nuts (not illustrated in the drawings).

The rear end portion of the stereo camera device 60 overlaps with a front portion of the hood member 46 (this also applies to the hood member 46 that is integral to the base member 22, illustrated in FIG. 10) in the vehicle front-rear direction in side view (in FIG. 2, the overlap amount is indicated by the letter V). In other words, the front portion of the hood member 46 covers a vehicle width direction substantially central portion of the rear end portion of the stereo camera device 60 from the vehicle upper side.

The front wall 54 of the housing 50 is thus disposed close to a rear wall 60B (see FIG. 2) of a device body 60A of the stereo camera device 60. Note that an isosceles trapezoidal shaped view angle hood 64 that becomes wider in the vehicle width direction on progression toward the vehicle front in plan view is integrally formed to the device body 60A of the stereo camera device 60 at the vehicle front of each of the stereo cameras 62.

Moreover, as illustrated in FIG. 1 to FIG. 3, front portions of the stereo camera device 60 and the housing 50 are covered from the vehicle lower side by the main cover 70. The main cover 70 is formed from a resin material such as polycarbonate (PC), and includes a rectangular flat plate shaped bottom wall 72, a front wall 74 that curves in a circular arc shaped cross-section protruding toward the vehicle lower side so as to extend from a front end portion of the bottom wall 72 toward the vehicle front and upper side, and left and right side walls 76 that are tall enough to house the front portions of the stereo camera device 60 and the housing 50.

The pair of left and right anchor claws 78 are provided extending toward the vehicle rear at vehicle front-rear direction substantially central portions of the bottom wall 72 alongside the left and right side walls 76. The anchor claws 78 are inserted into the respective anchoring portions 26 formed in the base member 22 from the vehicle front and are anchored to the anchoring portions 26. The pair of left and right anchor claws 79 are provided extending toward the vehicle rear at an inner face on the vehicle width direction center side of the front wall 74. The anchor claws 79 are inserted into the respective anchoring holes 28 formed in the sub base member 24 from the vehicle front and are anchored to the anchoring holes 28.

Namely, the main cover 70 is attached to the base member 22 and the sub base member 24 by inserting and anchoring the anchor claws 78 and the anchor claws 79 to the respective anchoring portions 26 and anchoring holes 28. As illustrated by the single dot-dashed lines in FIG. 2, a lower end portion (boundary between the bottom wall 72 and the front wall 74) 73 of the main cover 70 does not project to the vehicle lower side of a line of sight Y of an occupant (driver) that passes a lower edge of the electronic interior mirror 90 (securing the field of view).

Moreover, as illustrated in FIG. 1 and FIG. 2, an overhead console 16 including an interior light (not illustrated in the drawings) and the like is disposed at the vehicle rear of the housing 50 (sensor unit 20) and at the vehicle lower side of a roof header 18. A sub cover 80 that covers between the main cover 70 and the overhead console 16 (remainder of the rear portion of the housing 50) is provided at the vehicle rear of the main cover 70 and at the vehicle front of the overhead console 16.

The sub cover 80 is also formed from a resin material such as polycarbonate (PC), and includes a substantially flat plate shaped bottom wall 82 and left and right side walls 84 extending from both left and right end portions of a rear end portion of the bottom wall 82 toward the vehicle upper side. The entirety of the rear end portion of the bottom wall 82 in the vehicle width direction is bent into a substantially L-shaped cross-section profile protruding toward the vehicle upper side. The left and right side walls 84 are bent into substantially L-shaped cross-section profiles protruding toward the vehicle width direction inner side.

The bent profiles (steps) of the bottom wall 82 and the side walls 84 of the sub cover 80 facilitate entry of fingertips into a gap between an upper edge of the electronic interior mirror 90 and a rear end portion of the bottom wall 82 of the sub cover 80 (or the side walls 84) when gripping an upper end portion and lower end portion of the electronic interior mirror 90 with the fingertips in order to manually adjust the position of the electronic interior mirror 90.

Note that a pair of left and right anchor claws (not illustrated in the drawings) are provided projecting toward the vehicle front at a front end portion of the bottom wall 82 of the sub cover 80. These anchor claws are anchored to a rear end portion of the main cover 70. Moreover, both left and right end portions of the bottom wall 82 of the sub cover 80 (in front of the side walls 84) are provided with a pair of left and right anchor claws (not illustrated in the drawings) projecting toward the vehicle upper side. These anchor claws are inserted into and anchored to anchoring holes (not illustrated in the drawings), serving as anchoring portions, formed in the main cover 70.

Accordingly, first the anchor claws at the front end portion of the bottom wall 82 are anchored to the rear end portion of the main cover 70, and then the anchor claws at both the left and right end portions of the bottom wall 82 are inserted into and anchored to the anchoring holes in the main cover 70. The sub cover 80 is thereby attached between the main cover 70 and the overhead console 16.

A notch (not illustrated in the drawings) with a substantially semicircular arc shape toward the vehicle rear in bottom face view is cut into a vehicle width direction central portion of a front end portion of the bottom wall 82 of the sub cover 80 (between the anchor claws provided to the front end portion of the bottom wall 82). Moreover, a notch (not illustrated in the drawings) with a substantially semicircular arc shape toward the vehicle rear in bottom face view is cut into a vehicle width direction central portion of a rear end portion of the bottom wall 72 of the main cover 70.

The notch in the main cover 70 and the notch in the sub cover 80 form an opening through which the ball joint 68 is exposed. Note that a covering portion 86 with a substantially U-shape in bottom face view may be formed projecting toward the vehicle lower side at a peripheral edge of the notch in the sub cover 80. Such a configuration is preferable since the covering portion 86 is capable of hiding the ball joint 68 from the line of sight of an occupant (driver).

Explanation follows regarding operation of the sensor mount structure 10 (sensor unit 20) according to the present exemplary embodiment configured as described above.

The locator/telephoto camera device 30 is configured by the locator camera 42 and the telephoto camera 44 that have different focal distances from each other. This thereby enables the detection performance of surroundings information for the vehicle 12 to be improved in comparison to cases in which the locator camera 42 and the telephoto camera 44 are not provided. Moreover, as illustrated in FIG. 6, the protruding ledge 38 (device body 30A) at the vehicle front and lower side of the locator camera 42 and the telephoto camera 44 is provided with the (black colored) hood member 46.

Accordingly, reflection of light that has passed through the front windshield glass 14 (capture of glare by the locator camera 42 and the telephoto camera 44) can be suppressed or prevented in comparison to cases in which the hood member 46 is not provided to the protruding ledge 38 (device body 30A) at the vehicle front and lower side of the locator camera 42 and the telephoto camera 44. This thereby enables any reduction in the detection performance of surroundings information for the vehicle 12 to be suppressed or prevented.

Moreover, the heaters 48 are provided at the lower face of the hood member 46, with the insulating sheet interposed between the lower face of the hood member 46 and the heaters 48. Anti-fogging performance of the front windshield glass 14 is thus secured. Note that as illustrated in FIG. 10, forming the hood member 46 integrally to the base member 22 from a metal such as an aluminum alloy enables efficient transfer of the heat of the heaters 48 from the hood member 46 to the base member 22, thereby enabling the anti-fogging performance of the front windshield glass 14 to be improved.

Moreover, integrally forming the hood member 46 to the base member 22 enables the number of components configuring the locator/telephoto camera device 30 to be reduced in comparison to cases in which the hood member 46 is provided separately to the protruding ledge 38 (device body 30A), thereby enabling a reduction in manufacturing costs.

Moreover, as illustrated in FIG. 2, the pair of left and right stereo cameras 62 (stereo camera device 60) are disposed further toward the vehicle front than the locator camera 42 and the telephoto camera 44 (locator/telephoto camera device 30). The front end portion of the hood member 46 overlaps the vehicle upper side of the rear end portion of the stereo camera device 60 in the vehicle front-rear direction. Namely, the front wall 54 of the housing 50 is disposed close to the rear wall 60B of the device body 60A of the stereo camera device 60.

Accordingly, the vehicle front-rear direction length from the front end portion of the stereo camera device 60 (stereo cameras 62) to the rear end portion of the locator/telephoto camera device 30 (locator camera 42 and telephoto camera 44) can be reduced in comparison, for example, to cases in which the rear wall 60B of the stereo camera device 60 is disposed further toward the vehicle front than the front end portion of the hood member 46. This thereby enables at least the vehicle front-rear direction length of the sensor unit 20 to be reduced, and enables a reduction in the amount of space needed for installation of the locator/telephoto camera device 30 and the stereo camera device 60.

Moreover, as illustrated in FIG. 7 to FIG. 9, the locator camera 42 and the telephoto camera 44 are attachment to the front wall 34 of the device body 30A independently of one another. Namely, the respective brackets 43A, 45A of the locator camera 42 and the telephoto camera 44 that are disposed close to each other are disposed offset to each other in the vertical direction (at different height positions to each other), and are screwed to the front wall 34 of the device body 30A with respective screws 94.

Accordingly, unwanted effects caused by variation in the relative positions of the locator camera 42 and the telephoto camera 44 can be reduced in comparison to cases in which the brackets 43A of the locator camera 42 and the brackets 45A of the telephoto camera 44 are disposed at the same height position as each other and the bracket 45A and the bracket 43A on the mutually opposing sides in the vehicle width direction (vehicle width direction center sides) are superimposed in the vehicle front-rear direction and attached to the front wall 34 of the device body 30A by jointly fastening using a single screw 94. This thereby enables any reduction in the detection performance of surroundings information for the vehicle 12 to be suppressed or prevented.

Moreover, the telephoto camera 44 is formed longer in the vehicle front-rear direction than the locator camera 42, and is disposed at a lower position than the locator camera 42. Accordingly, even though the locator camera 42 and the telephoto camera 44 have different lengths to each other, both the locator camera 42 and the telephoto camera 44 can be disposed close to the inner surface of the front windshield glass 14, enabling any reduction in the detection performance of surroundings information for the vehicle to be further suppressed or prevented.

Moreover, the locator camera 42 and the telephoto camera 44 are electrically connected to the common (single) electronic board 40. This thereby enables the number of components of the sensor unit 20 to be reduced in comparison to cases in which, for example, an electronic board is provided for each camera, enabling manufacturing costs of the sensor unit 20 to be reduced.

Moreover, the rear face 43C of the locator camera 42 and the rear face 45C of the telephoto camera 44 are disposed at the same position as each other in the vehicle front-rear direction. The rear end portion of the electronic board 40 disposed in a forward-tilting orientation is formed with the notches 41 that accommodate the rear end lower portion 43D of the locator camera 42 and the rear end lower portion 45D of the telephoto camera 44. Accordingly, the notch depth of the notches 41 formed in the rear end portion of the electronic board 40 can be reduced in comparison to cases in which, for example, the front face of the locator camera 42 and the front face of the telephoto camera 44 are disposed at the same position as each other in the vehicle front-rear direction.

Namely, since the locator camera 42 has a shorter length, in order to dispose the front face of the locator camera 42 at the same position as the front face of the telephoto camera 44 in the vehicle front-rear direction, it would be necessary to increase the notch depth of the electronic board 40 at the rear of the locator camera 42. In the present exemplary embodiment, the rear face 43C of the locator camera 42 and the rear face 45C of the telephoto camera 44 are disposed at the same position in the vehicle front-rear direction, enabling this issue to be prevented, and enabling an area to be secured on the electronic board 40 for attaching various electronic components (not illustrated in the drawings).

Moreover, the housing 50 is formed in a shape of a casing open toward the vehicle upper side, thereby securing support rigidity of the housing 50 with respect to the electronic interior mirror 90. The housing 50 with secured support rigidity houses at least the periphery of the lower portion of the locator/telephoto camera device 30, including the electronic board 40. This thereby enables effective protection of the electronic board 40, and enables a further reduction in the amount of space needed for installation of the locator/telephoto camera device 30.

The device body 30A of the locator/telephoto camera device 30 is fastened to the base member 22 together with the housing 50 that supports the electronic interior mirror 90. This thereby enables a reduction in the number of weld bolts 96 (number of components) in comparison to cases in which the device body 30A is fastened to the base member 22 separately to the housing 50.

Moreover, the space (gap) S is formed between the outer faces of the locator/telephoto camera device 30 (device body 30A and electronic board 40) housed inside the housing 50 and the inner faces of the housing 50 (the inner faces of the housing 50 are disposed at a separation from the outer faces of the locator/telephoto camera device 30 housed inside the housing 50). Accordingly, load is not transmitted at the locations formed with the space S.

Accordingly, load applied to the housing 50 when an occupant (driver) moves the electronic interior mirror 90 can be suppressed or prevented from acting through the arm member 92 on the locator/telephoto camera device 30 in comparison to cases in which the space S is not formed between the outer faces of the locator/telephoto camera device 30 housed inside the housing 50 and the inner faces of the housing 50. This thereby enables shifting of the position (optical axis) of the locator camera 42 and the telephoto camera 44 to be suppressed or prevented.

Moreover, the notch 59 (opening) to allow the connector 39 provided to the electronic board 40 to project out is formed in the right side wall 58R and the right flange 55R of the housing 50, between the through holes 55A separated from each other in the vehicle front-rear direction.

Accordingly, the layout of the wiring H can be simplified in comparison to cases in which the housing 50 does not include the notch 59 (opening) allowing the connector 39 to project out. Moreover, there is no need to, for example, extend a portion of the electronic board 40 so as to extend to the exterior of the housing 50 in order to attach the connector 39, thereby enabling a reduction in size of the electronic board 40.

The pair of front and rear ribs 57 are integrally formed extending from the lower face of the peripheral edge of the notch 59 formed in the right flange 55R to the outer face of the right side wall 58R and the outer face of the bottom wall 52, thereby reinforcing the right flange 55R that is interrupted by the notch 59. This thereby enables a reduction in the rigidity of the housing 50 to be suppressed despite the formation of the notch 59.

Moreover, as illustrated in FIG. 4, the holder portions 27 are provided to both vehicle width direction end portions of the base member 22. When the anchor claws (not illustrated in the drawings) provided along the wiring (not illustrated in the drawings) connected to the respective components as appropriate are fitted into the holder portions 27 from the vehicle rear or the vehicle front, the wiring is held by the base member 22. Accordingly, the number of components in the sensor unit 20 can be reduced in comparison to cases in which the holder portions 27 are provided as a separate component to the base member 22.

Explanation has been given regarding the sensor mount structure 10 according to the present exemplary embodiment with reference to the drawings. However, the sensor mount structure 10 according to the present exemplary embodiment is not limited to the configuration illustrated in the drawings, and various design modifications are possible within a range not departing from the spirit of the present disclosure. For example, the electronic board 40 is not limited to a configuration that is attached by being screwed to the side wall 36 and the protruding ledge 38 of the device body 30A.

Moreover, part of the device body 30A of the locator/telephoto camera device 30 (not including the flanges 33) may be configured so as to contact the housing 50. In such cases, heat generated by the locator/telephoto camera device 30 can be released to the housing 50 (the housing 50 can be utilized as a heat dissipating member).

Moreover, the first sensor and the second sensor are not limited to the locator camera 42 and the telephoto camera 44, and, for example, infrared sensors or the like may be employed as long as they are capable of detecting surroundings information for the vehicle 12. Moreover, the hood member 46 is not limited to a black colored configuration, and, for example, black nonwoven fabric (not illustrated in the drawings) may be affixed to an upper face of the hood member 46.

What is claimed is:

1. A sensor mount structure, comprising: a first sensor device that includes a first sensor configured to detect surroundings information for a vehicle, and that is attached to an inner surface of a front windshield glass further toward a vehicle front and upper side than an interior mirror; a second sensor device that includes a second sensor configured to detect surroundings information for the vehicle, and that is attached to the inner surface of the front windshield glass further toward the vehicle front and upper side than the interior mirror and further toward the vehicle front side than the first sensor device; and a view angle hood member for the first sensor, the view angle hood member being disposed at a vehicle front and lower side of the first sensor, and disposed at a vehicle rear and upper side of the second sensor, the view angle hood member overlapping with the second sensor device in a vehicle front-rear direction in side view along a vehicle width direction, wherein the interior mirror is supported by a support member formed in a shape of a casing, the first sensor device includes a device body holding the first sensor, a portion of the device body is housed in the support member, and the support member is fastened, together with the device body, to a base member attached to the inner surface of the front windshield glass with a predetermined gap formed between an outer face of the portion of the device body housed in the support member and an inner face of the support member such that the inner face of the support member has no surface contacting the outer face of the portion of the device body; wherein the outer face of the portion of the device body includes a lower outer face, a rear outer face, and side outer faces, the inner face of the support member includes a bottom inner face, a rear inner face, and side inner faces, and the predetermined gap separates the lower outer face from the bottom inner face, the rear outer face from the rear inner face, and the side outer faces from the side inner faces.

2. The sensor mount structure of claim 1, wherein the view angle hood member is integrally formed with the base member.

3. The sensor mount structure of claim 2, wherein:
   the base member is made from metal; and
   a heat generating body is provided at a lower face of the view angle hood member.

4. The sensor mount structure of claim 1, wherein the first sensor is configured by a pair of left and right cameras having different focal distances from each other.

* * * * *